Jan. 6, 1953  N. W. F. PHILLIPS  2,624,772
ELECTRICAL CONTACT BETWEEN ALUMINUM AND GRAPHITE
Filed Aug. 24, 1948
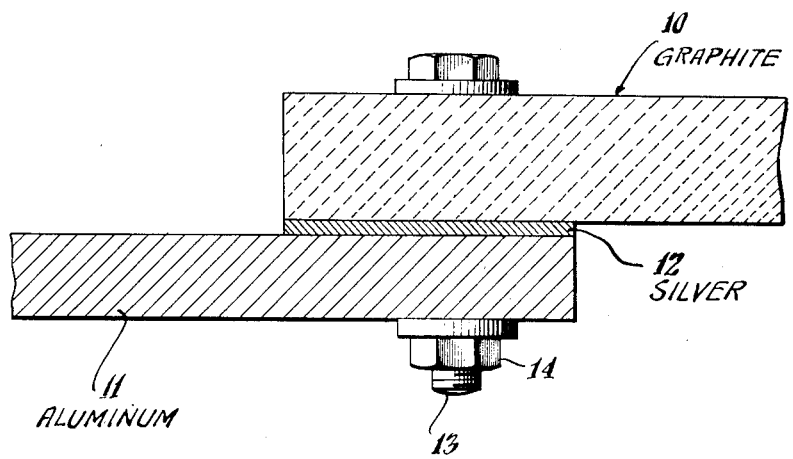
INVENTOR.
Norman W. F. Phillips
BY
Robert S. Dunham
ATTORNEY Patented Jan. 6, 1953

2,624,772

UNITED STATES PATENT OFFICE 2,624,772

ELECTRICAL CONTACT BETWEEN ALUMINUM AND GRAPHITE

Norman W. F. Phillips, Arvida, Quebec, Canada, assignor to Aluminium Laboratories Limited, Montreal, Quebec, Canada, a corporation of Canada Application August 24, 1948, Serial No. 45,848
In Canada September 15, 1947

8 Claims. (Cl. 173—324)

This invention relates to an electrical contact between aluminum and graphite.

The electrical connection of aluminum to graphite, for example the connection of aluminum bus bars to graphite electrodes, is common and in many cases is necessitated or at least rendered highly desirable by certain advantageous properties, as for example corrosion resistance, of aluminum conductors. I have made the surprising discovery, which has not heretofore been suggested, that the contact between aluminum and graphite is unusual in that the resistance of the contact is abnormally high. Thus, I have found the resistance of an aluminum-graphite contact at 25° C. under a pressure of 50 pounds per square inch to be 25,000 micro-ohms per square inch, or under a pressure of 1,000 pounds per square inch, 1250 micro-ohms per square inch, whereas the corresponding readings with a copper-graphite contact again at 25° C. were 450 micro-ohms per square inch and 50 micro-ohms per square inch respectively. At higher temperatures the unusual magnitude of the resistance of the aluminum-graphite contact is even more pronounced.

I have also discovered that this abnormally high resistance of an aluminum-graphite contact can be sharply reduced at any temperature by providing between the aluminum and the graphite a layer of any stable metal other than aluminum, and that this layer may be a thin film of a thickness of the order of .002 inch or less, so that the joint is not thickened perceptibly and so that there is no appreciable resistance offered by the interposed layer of metal. By "a stable metal" is meant a metal which does not oxidize rapidly at operating temperatures. A suitable metal is silver and the best results have been obtained with an alloy containing equal parts of zinc and cadmium, but any stable metal other than aluminum may be used in any form, for example as a foil inserted between the graphite and aluminum contact surfaces or as an integral coating applied either to the graphite or to the aluminum contact surfaces by spraying, by tinning or by electro-deposition. The metal is preferably one of high conductivity, such as silver or the alloy mentioned above, other examples useful in certain cases being copper, and foils of brass, bronze, and the like, all of which are metals heavier than aluminum. When the graphite electrodes are used, however, in electrolytic cells (of the fused electrolyte type) for producing or refining magnesium, the contaminating effects of copper make it preferable to employ materials, such as those first mentioned, which do not contain copper.

A particular advantage of the zinc-cadmium alloy film is that is is easy to apply by coating the aluminum contact surface, e. g. as a solder tinned on the aluminum. Other suitable solders of relatively low resistance are zinc-lead-cadmium, zinc-bismuth-cadmium and lead-bismuth-cadmium alloys.

The invention is illustrated in the accompanying drawing in which 10 is a portion of a graphite electrode, 11 is part of an aluminum bus bar, 12 is a thin film of silver, and the electrode and the bus bar are drawn together to exert pressure on the joint by means of the bolt 13 and nut 14. Experiments show that this joint has low resistivity as indicated by the following results obtained at room temperatures:

| Contact Type | Resistance (Micro-ohms/sq. in. contact surface) | |
|---|---|---|
| | 50 p. s. i. contact pressure | 1,000 p. s. i. contact pressure |
| Aluminum-silver-graphite | 500 | 70 |
| Aluminum-graphite | 30,000 | 1,000 |

The pressures were measured in pounds per square inch, abbreviated herein as p. s. i. A similar marked reduction in resistance was obtained at high temperatures, the results of tests carried out for seventeen days at 300° C. and a pressure of 1000 p. s. i., being as follows:

| Contact Type | Resistance (Micro-ohms/sq. in. contact surface) |
|---|---|
| Aluminum-graphite | 4,000 |
| Aluminum-zinc and cadmium alloy-graphite | 400 |

As indicated, the contact layer of metal is preferably very thin, e. g. of the order of 0.002 inch; silver foil as thick as 0.008 inch is satisfactory, but relatively high thicknesses tend to become uneconomical or otherwise to fall short of best efficiency in the desired joint. Ordinarily the foil or like element 12, which is effectively covered by the facing surfaces of the electrode 10 and bus bar 11, serves no supporting or like structural purpose; its primary function is of an electrical nature, and as distinguished from separating devices designed to keep an aluminum bus bar cool, an important characteristic (of the present arrangement) is that the resistance of the aluminum-graphite joint is materially reduced at both high and low temperatures, i. e. even though the aluminum is heated up along with the graphite.

It is to be understood that the invention is not limited to the specific structures and materials herein set forth by way of example but may be embodied in other forms without departure from its spirit as defined by the following claims.

I claim:

1. An electrically connected structure comprising a graphite element, a massive aluminum element, a low resistance film of a stable metal other than aluminum disposed between said elements, and clamping means forcing said elements together, to hold the film in electrical contact with both, under pressure.

2. An electrical contact as defined in claim 1, in which the film is composed mainly of silver.

3. An electrical contact as defined in claim 1, in which the film is composed of an alloy of zinc and cadmium.

4. An electrical contact as defined in claim 3, in which zinc and cadmium are present in the alloy in substantially equal parts.

5. In combination with massive graphite and aluminum elements having facing contact surfaces, means effecting electrical contact between said elements at substantially lower resistance than would be provided by direct engagement of said surfaces, said means comprising a film of a highly conductive metal which is heavier than aluminum, disposed between and in intimate contact with said surfaces, and means mechanically clamping said graphite and aluminum elements together with said film between them.

6. An electrical contact as defined in claim 5, in which the metal film is composed of silver foil.

7. An electrical contact as defined in claim 5, in which the metal film is integral with the aluminum contact surface.

8. An electrical contact as defined in claim 5, in which the metal film is integral with the graphite contact surface.

NORMAN W. F. PHILLIPS.

REFERENCES CITED

The following references are of record in the file of this patent:

UNITED STATES PATENTS

| Number | Name | Date |
| --- | --- | --- |
| 441,130 | Brewer | Nov. 25, 1890 |
| 996,579 | Geisenhoner | June 27, 1911 |
| 1,626,104 | Swift | Apr. 26, 1927 |
| 1,819,246 | Jones | Aug. 18, 1931 |
| 2,249,765 | Hulse | July 22, 1941 |

FOREIGN PATENTS

| Number | Country | Date |
| --- | --- | --- |
| 26,375 | England | of 1903 |
| 548,330 | England | Oct. 6, 1942 |
| 757 | England | of 1893 |